United States Patent Office 3,484,462
Patented Dec. 16, 1969

3,484,462
19-NOR-Δ$^{4,9,11}$-GONATRIENE-3-ONES
Daniel Bertin, Montrouge, and Andre Pierdet, Noisy-le-Sec, France, assignors to Roussel UCLAF, Paris, France, a corporation of France
No Drawing. Filed Feb. 10, 1967, Ser. No. 615,088
Claims priority, application France, Feb. 18, 1966, 50,197; Oct. 20, 1966, 80,898
Int. Cl. C07c 169/34
U.S. Cl. 260—397.3                11 Claims

ABSTRACT OF THE DISCLOSURE

This invention relates to a process for the production of Δ$^{4,9,11}$-gonatriene-3-ones of the formula

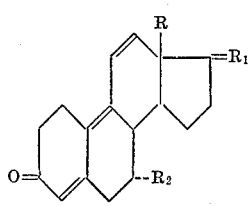

wherein R is a lower alkyl radical of 1 to 4 carbon atoms, $R_1$ is selected from the group consisting of oxygen and

$R_2$ is selected from the group consisting of hydrogen and methyl, R' is selected from the group consisting of hydrogen and an acyl radical of an organic carboxylic acid of 1 to 18 carbon atoms and R'' is selected from the group consisting of hydrogen and a lower saturated or unsaturated substituted or unsubstituted aliphatic radical, which comprises subjecting a corresponding Δ$^{4,9}$-gonadiene-11β-ol-3-one, to the action of an aqueous aliphatic carboxylic acid of 1 to 4 carbon atoms at elevated temperatures.

CLAIM FOR PRIORITY

This application is based on the corresponding French patent applications 50,197, filed Feb. 18, 1966 and 80,898, filed Oct. 20, 1966, the right of priority of which under the provisions of 35 U.S.C. 119 is hereby claimed.

THE PRIOR ART

The preparation of Δ$^{4,9,11}$-gonatriene-3-ones by subjecting the corresponding Δ$^{4,9}$-gonadiene-11β-ol-3-ones to the action of a strong acid such as concentrated sulfuric acid is described in copending commonly assigned U.S. Patent application Ser. No. 458,416, filed May 24, 1965, now U.S. Patent No. 3,424,745.

The compounds of Formula I are known to possess interesting physiological properties. [See, for example, Feyel-Cabanes, Annales d'Endocrinologie, Paris, vol. 26, pp. 95–101 (1965), Nomine et al., C. R. Acad. Sci., vol. 260, pp. 4,545–4,548 (1965), and Anner et al., Second International Congress on Hormonal Steroids, Milan, Italy (1965)].

OBJECTS OF THE INVENTION

It is an object of the invention to provide a novel process for the preparation of Δ$^{4,9,11}$-gonatriene-3-ones of Formula I under aqueous conditions.

It is another object of the invention to provide novel intermediates for the preparation of Δ$^{4,9,11}$-gonatriene-3-ones of Formula I.

These and other objects and advantages of the invention will become obvious from the following detailed description.

DESCRIPTION OF THE INVENTION

The novel process of the invention for the preparation of Δ$^{4,9,11}$-gonatriene-3-ones of Formula I comprises subjecting a Δ$^{4,9}$-gonadiene-11β-ol-3-one of the formula

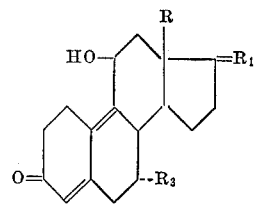

wherein R, $R_1$ and $R_2$ have the above definition to the action of an aqueous aliphatic carboxylic acid of 1 to 4 carbon atoms at elevated temperatures, preferably about 100° C., to form the corresponding Δ$^{4,9,11}$-gonatriene-3-one of Formula I and recovering the latter. By the use of an organic carboxylic acid rather than a strong acid such as concentrated sulfuric acid, the process of the invention converts Δ$^{4,9}$-gonadiene-11β-ol-3-ones into the corresponding Δ$^{4,9,11}$-trienic compounds without degradation or rearrangement even if the dienic compounds contain groups which are labile in the presence of strong acids in anhydrous media such as 17β-hydroxy and 17α-ethynyl groups.

While the reaction is preferably carried out at temperatures of about 100° C., the elevated temperature may be between 90° to 110° C. Examples of suitable aliphatic carboxylic acids are formic acid, acetic acid, propionic acid, etc. The said acids contain up to 50% of water, preferably 20 to 40%.

A variation of the process of the invention effects the dehydration of the Δ$^{4,9}$-gonadiene-11β-ol-3-ones of Formula II in two steps by first esterifying a Δ$^{4,9}$-gonadiene-11β-ol-3-one of Formula II at temperatures between 10° and 30° C. with an aliphatic carboxylic acid of 1 to 4 carbon atoms to form a compound of the formula

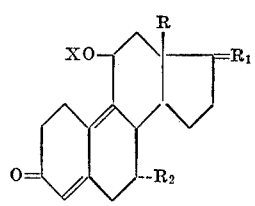

wherein R, $R_1$ and $R_2$ have the above definitions and X is the acyl radical of an aliphatic carboxylic acid of 1 to 4 carbon atoms and then heating the latter at elevated temperatures in the presence of an aqueous aliphatic carboxylic acid of 1 to 4 carbon atoms to form the corresponding Δ$^{4,9,11}$-gonatrient-3-one of Formula I.

The $\Delta^{4,9}$-gonadiene-11$\beta$-ol-3-ones of Formula II used as starting materials can be prepared by the methods described in U.S. Patents No. 3,282,785 and No. 3,301,756, and in copending, commonly assigned U.S. application Ser. No. 587,001, filed Oct. 17, 1966.

In Formula I, R is preferably selected from the group consisting of methyl, ethyl, propyl and butyl. R″ when other than hydrogen is preferably selected from the group consisting of ethynyl, chloroethynyl, 1-propynyl, 2-propynyl, vinyl, allyl, methyl and ethyl.

Examples of suitable organic acids of 1 to 18 carbon atoms may be derived from an aliphatic, aromatic, cycloaliphatic or heterocyclic carboxylic acid. Examples of suitable acids are alkanoic acids, alkenoic acids, cycloalkyl carboxylic acids, cycloalkyl alkanoic acids, arylalkanoic acids, aryl carboxylic acids, phenoxy alkanoic acids, heterocyclic carboxylic acids, $\beta$-ketoalkanoic acids.

In the following examples, there are described several preferred embodiments to illustrate the invention. However, it should be understood that the invention is not intended to be limited to the specific embodiments.

EXAMPLE I

Preparation of $\Delta^{4,9,11}$-estratriene-3,17-dione 0.500 gm. of $\Delta^{4,9}$-estradiene-11$\beta$-ol-3,17-dione were introduced into 5 cc. of 60% aqueous formic acid (40% by volume of water), and the mixture was agitated for 20 minutes under an atmosphere of nitrogen and at a temperature of 100° C. Then, after cooling, the reaction mixture was poured into an ice-water mixture, neutralized by the addition of sodium hydroxide and extracted with chloroform. The chloroform solution was washed with water, dried and concentrated to dryness under reduced pressure. The residue was subjected to chromatography over silica gel with elution with benzene containing 30% ethyl acetate to obtain $\Delta^{4,9,11}$-estratriene-3,17-dione having a melting point of 140° C. and a specific rotation of $[\alpha]_D^{20} = +220°$ (c.=0.5% in chloroform).

EXAMPLE II

Preparation of 17$\alpha$-ethynyl-$\Delta^{4,9,11}$-estratriene-17$\beta$-ol-3-one 0.500 gm. of 17$\alpha$-ethynyl-$\Delta^{4,9}$-estradiene-11$\beta$,17$\beta$-diol-3-one were introduced into 5 cc. of 60% aqueous formic acid and the mixture was agitated for 12 minutes at a temperature of 100° C. under an atmosphere of nitrogen. After being cooled, the reaction mixture was poured into an ice-water mixture, neutralized and then the aqueous phase was extracted with chloroform. The chloroform solution was washed with water, dried and concentrated to dryness under reduced pressure. The reisdue was subjected to chromatography over silica gel with elution with benzene containing 30% of ethyl acetate to obtain 17$\alpha$-ethynyl-$\Delta^{4,9,11}$-estratriene-17$\beta$-ol-3-one having a melting point of 172° C. and a specific rotation of $[\alpha]_D^{20} = +63°$ (c.=0.5% in ethanol).

EXAMPLE III

Preparation of $\Delta^{4,9,11}$-estratriene-3,17-dione 0.100 gm. of $\Delta^{4,9}$-estradiene-11$\beta$-ol-3,17-dione were introduced into 1 cc. of 60% acetic acid, and the reaction mixture was maintained for 1 hour at about 105° C. under agitation and under an atmosphere of nitrogen. Then after cooling, the reaction mixture was poured into an ice-water mixture, neutralized with the addition of sodium bicarbonate and extracted with methylene chloride. The combined extracts were washed with water until the wash waters were neutral and the organic solution was dried and distilled to dryness under vacuum. The residue was subjected to chromatography over silica gel with elution with benzene containing 30% of ethyl acetate to obtain $\Delta^{4,9,11}$-estratriene-3,17-dione, having a melting point of 140° C. identical to the product obtained in Example I.

EXAMPLE IV

Preparation of 7$\alpha$-methyl-17$\alpha$-ethynyl-$\Delta^{4,9,11}$-estratriene-17$\beta$-ol-3-one Using the process of Example I, 60% aqueous formic acid was reacted at a temperature of 100° C. with agitation under an atmosphere of nitrogen with 7$\alpha$-methyl-17$\alpha$-ethynyl-$\Delta^{4,9}$-estradiene-11$\beta$,17$\beta$-diol-3-one, having a melting point of 195° C. (described in the U.S. patent application Ser. No. 587,001 filed Oct. 17, 1966). After purification, 7$\alpha$-methyl-17$\alpha$-ethynyl-$\Delta^{4,9,11}$-estratriene-17$\beta$-ol-3-one having a melting point of 215° C. and a specific rotation of $[\alpha]_D^{20} = -38°$ (c.=0.5% in methanol) was obtained. The product was identical to the product described in U.S. patent application Ser. No. 576,240 filed Aug. 31, 1966.

EXAMPLE V

Preparation of 17$\alpha$-ethynyl-$\Delta^{4,9,11}$-estratriene-17$\beta$-ol-3-one Step A: Preparation of 11$\beta$-acetoxy-17$\alpha$-ethynyl-$\Delta^{4,9}$-estradiene-17$\beta$-ol-3-one.—1 gm. of 17$\alpha$-ethynyl-$\Delta^{4,9}$-estradiene-11$\beta$,17$\beta$-diol-3-one was dissolved in 50 cc. of methylene chloride containing 1% of acetic acid. 0.2 cc. of an aqueous solution of concentrated perchloric acid was added thereto and the mixture was agitated for 2 minutes at a temperature of 20–25° C. Then the reaction mixture was poured into ice water and the organic phase was separated, washed with water until neutrality dried and evaporated to dryness under vacuum to obtain 1.2 gm. of product, which was then purified by chromatography over silica and recrystallization from ethanol to obtain 140 mg. of 11$\beta$-acetoxy-17$\alpha$-ethynyl-$\Delta^{4,9}$-estradiene-17$\beta$-ol-3-one having a melting point of 215° C. and a specific rotation of $[\alpha]_D^{20} = -56° \pm 2$ (0.4% in methanol).

Analysis.—$C_{22}H_{26}O_4$; molecular weight=354.43; calculated: C, 74.55%; H, 7.39%. Found: C, 74.3; H, 7.4.

Infra-red spectra (chloroform):
  Presence of OH
  Presence of —C≡CH
  Presence of acetate
Ultra-violet spectra (ethanol):
  max. at 292 m$\mu$ $E_{1cm.}^{1\%} = 570$ R.M.N. spectra:
  Methyl in the 18-position: 62.5 Hz.
  Acetoxyl: 114 Hz.
  Ethynyl: 146.5 Hz.
  $H_{11}$ triplet: towards 348.5 Hz.

This product is not described in the literature.

Step B: Preparation of 17$\alpha$-ethynyl-$\Delta^{4,9,11}$-estratriene-17$\beta$-ol-3-one.—0.078 gm. of 11$\beta$-acetoxy-17$\alpha$-ethynyl-$\Delta^{4,9}$-estradiene-17$\beta$-ol-3-one were introduced into 1 cc. of 60% aqueous formic acid. The reaction mixture was heated to 105° C., and kept at this temperature for 22 minutes under agitation and an atmosphere of nitrogen. Then the reaction mixture was poured into an ice-water mixture and the precipitate formed was vacuum filtered off. The filtrate was washed with water until neutrality dried and purified by chromatography over silica gel with elution with benzene containing 30% of ethyl acetate to obtain 17$\alpha$-ethynyl-$\Delta^{4,9,11}$-estratriene-17$\beta$-ol-3-one having a melting point of 172° C. The product was identical to the product obtained in Example II.

EXAMPLE VI

Preparation of 17$\alpha$-ethynyl-$\Delta^{4,9,11}$-estratriene-17$\beta$-ol-3-one Step A: 11$\beta$-formyloxy-17$\alpha$-ethynyl-$\Delta^{4,9}$-estradiene-17$\beta$-ol-3-one.—1 gm. of 17$\alpha$-ethynyl-$\Delta^{4,9}$-estradiene-11$\beta$,17$\beta$-diol-3-one was dissolved in 15 cc. of a formic acid solution containing 20% of water and the reaction mixture was agitated for 10 minutes at room temperature. Then the solution was poured into an ice-water mixture and extracted with ether. The organic phase was separated and washed first with water, then with a sodium bicarbonate solution and again with water, dried over sodium sulfate and evaporated to dryness under vacuum to obtain 1.10 gm. of raw product, which were purified by recrystallization from refluxing alcohol to obtain 573 mg. of 11β-formyloxy-17α-ethynyl-Δ$^{4,9}$-estradiene-17β-ol-3-one having a melting point of 164° C. and a specific rotation of $[\alpha]_D^{20} = -106° \pm 3°$ (c.=0.5% in methanol).

Analysis.—$C_{21}H_{24}O_4$; molecular weight=340.43; calculated: C, 74.09%; H, 7.11%. Found: C, 74.3; H, 7.2.

Infra-red spectra:
  Presence of OH.
  Presence of —C≡CH.
  Presence of formate.

Ultra-violet spectra (ethanol):
  λmax. at 240 mμ
  $E_{1cm.}^{1\%} = 121$
  $E_{1cm.}^{1\%} = 593$
  λmax. at 291 mμ

The R.M.N. spectra, (effected in $CDCl_3$) confirmed the structure of the product obtained and in particular, the orientation of the formyloxy in the 11β-position. The following values were obtained for the different substituents.

Methyl in the 18-position: 64 Hz.
Ethyl: 147 Hz.
$H_4$ ethylenic: 329 Hz.
H of formyl: 455 Hz.

This product is not described in the literature.

Step B: Preparation of 17α-ethynyl-Δ$^{4,9,11}$-estratriene-17β-ol-3-one.—Using the process of Step B of Example V, 11β-formyloxy-17α-ethynyl - Δ$^{4,9}$ - estradiene-17β-ol-3-one was converted to 17α-ethynyl-Δ$^{4,9,11}$-estratriene-17β-ol-3-one having a melting point of 172° C., identical to the product obtained in Example II.

EXAMPLE VII

Preparation of 17α-ethynyl-Δ$^{4,9,11}$-estratriene-17β-ol-3-one 0.500 gm. of 17α-ethynyl-Δ$^{4,9}$-estradiene-11β-17β-diol-3-one were introduced into 5 cc. of 60% aqueous formic acid and the solution was agitated for 30 minutes at about 20° C. Then the reaction mixture was poured into ice water and the precipitate formed was vacuum filtered, washed and dried. The raw 11β-formyloxy-17α-ethynyl-Δ$^{4,9}$-estradiene-17β-ol-3-one thus obtained was introduced into 5 cc. of 60% aqueous formic acid previously heated to 100° C. and this temperature was maintained for 2 minutes. Then the reaction mixture was cooled and poured into ice water and the precipitate formed was vacuum filtered off. The solution was washed with water, dried and purified by chromatography over silica gel with elution with benzene contaiinng 30% of ethyl acetate to obtain 17α-ethynyl-Δ$^{4,9,11}$-estratriene-17β-ol-3-one having a melting point of 172° C. identical to the product obtained in Example II.

EXAMPLE VIII

Preparation of 17α-methyl-Δ$^{4,9,11}$-estratriene-17β-ol-3-one

Step A: Preparation of 11β-formyloxy-17α-methyl-Δ$^{4,9}$-estradiene-17β-ol-3-one.—1 gm. of 17α-methyl-Δ$^{4,9}$-estradiene-11β,17β-diol-3-one, having a melting point of 196° C., was dissolved in 10 cc. of formic acid containing 20% of water and the solution was agitated for 10 minutes at room temperature. The precipitate formed after addition of the solution to an ice-water mixture was filtered off and the filtrate was extracted with ether. The combined ethereal phases were washed with water until neutrality, dried over sodium sulfate and concentrated to dryness under reduced pressure, to obtain 1.050 gm. of 11β-formyloxy-17α-methyl-Δ$^{4,9}$-estradiene-17β-ol-3-one.

Ultra-violet spectra (in ethanol):
  Inflection toward 234 mμ
  $E_{1cm.}^{1\%} = 127$
  $E_{1cm.}^{1\%} = 546$
  λ max. at 292 mμ

Infra-red spectra (in chloroform):
  Max. at 1716 cm.$^{-1}$ and 1166 cm.$^{-1}$ (formate).
  Max. at 1663 cm.$^{-1}$ (conjugated ketone).

This product is not described in the literature.

Step B: Preparation of 17α-methyl-Δ$^{4,9,11}$-estratriene-17β-ol-3-one.—Using the process of Step B of Example V, 11β - formyloxy-17α-methyl-Δ$^{4,9}$-estradiene-17β-ol-3-one was converted to 17α-methyl-Δ$^{4,9,11}$-estratriene-17β-ol-3-one having a melting point of 170° C. and a specific rotation of $[\alpha]_D^{20} = -59°$ (in ethanol).

EXAMPLE IX

Preparation of 13β-ethyl-17α-ethynyl-Δ$^{4,9,11}$-gonatriene-17β-ol-3-one

Using the process of Example I, 13β-ethyl-17α-ethynyl-Δ$^{4,9}$-gonadiene-11β,17β-diol-3-one having a melting point of 200° C. (described in U.S. patent application Ser. No. 587,001, filed Oct. 17, 1966), was converted to 13β-ethyl-17α-ethynyl-Δ$^{4,9,11}$-gonatriene-17β-ol-3-one having a melting point of 154° C. and a specific rotation of $$[\alpha]_D^{20} = +84.5°$$

(in ethanol).

EXAMPLE X

Preparation of 7α,17α-dimethyl-Δ$^{4,9,11}$-estratriene-17β-ol-3-one

Step A: Preparation of 7α,17α-dimethyl-11β-hydroperoxy-Δ$^{4,9}$-estradiene-17β-ol-3-one.—1 gm. of 7α,17α-dimethyl-Δ$^{5(10),9(11)}$-estradiene-17β-ol-3-one described in U.S. patent application Ser. No. 576,240, filed Aug. 31, 1966), was introdudced into 28 cc. of ethanol containing 1% of triethylamine. A stream of oxygen was bubbled through this mixture for 24 hours at room temperature and thereafter, the reaction mixture was evaporated to dryness to obtain 1.4 gm. of 7α,17α-dimethyl-11β-hydroperoxy-Δ$^{4,9}$-estradiene-17β-ol-3-one, which was utilized as such for the next step.

This product is not described in the literature.

Step B: Preparation of 7α,17α-dimethyl-Δ$^{4,9}$-estradiene-11β,17β-diol-3-one.—1.4 gm. of 7α,17α-dimethyl-11β-hydroperoxy - Δ$^{4,9}$ - estradiene - 17β - ol - 3-one, obtained in Step A, were introduced into 5 cc. of ethanol and after 0.5 cc. of triethyl phosphite were added thereto, the mixture was agitated for 1 hour at reflux. Then the reaction mixture was cooled to room temperature, 1.1 cc. of 30% hydrogen peroxide and 1.1 cc. of water were added thereto and the mixture was agitated for 1 hour after which 35 cc. of water were added. The reaction mixture was extracted with methylene chloride and the organic phase was washed with water, dried over sodium sulfate and evaporated to dryness. The residue was triturated in hot isopropyl ether, then iced and filtered. The precipitate was vacuum filtered, washed with water and dried to obtain 0.59 gm. of 7α,17α-dimethyl-Δ$^{4,9}$-estradiene-11β,17β-diol-3-one.

This product is not described in the literature.

Step C: Preparation of 7α,17α-dimethyl-Δ$^{4,9,11}$-estratriene-17β-ol-3-one.—Using the process of Example I, 60% aqueous formic acid was reacted at a temperature of 100° C., and with agitation under an atmosphere of nitrogen with 7α,17α-dimethyl-Δ$^{4,9}$-estradiene-11β,17β-diol-3-one, and after purification, 7α,17α-dimethyl-Δ$^{4,9,11}$-estratriene-17β-ol-3-one having a melting point of 173° C. and a specific rotation of $[\alpha]_D^{20} = -125°$ (c.=0.57% in methanol) was obtained. The product was identical to the product described in U.S. patent application Ser. No. 576,240, filed Aug. 31, 1966.

EXAMPLE XI

Preparation of 17α-allyl-Δ$^{4,9,11}$-estratriene-17β-ol-3-one

Using the process of Example I, 17α-allyl-Δ$^{4,9}$-estradiene-11β,17β-diol-3-one was converted to 17α-allyl-Δ$^{4,9,11}$-estratriene-17β-ol-3-one having a melting point of 120° C. and a specific rotation of [α]$_D^{20}$=−72° (in ethanol).

EXAMPLE XII

Preparation of 17α-(1'-propynyl)-Δ$^{4,9,11}$-estratriene-17β-ol-3-one

Using the procedure of Example I, 17α-(1'-propynyl)-Δ$^{4,9}$-estradiene-11β,17β-diol-3-one was converted to 17α-(1'-propynyl)-Δ$^{4,9,11}$-estratriene-17β-ol-3-one having a melting point of 166° C. and a specific rotation of $$[α]_D^{20} = +115°$$

(in methanol).

Various modifications of the process of the invention may be made without departing from the spirit or scope thereof and it is to be understood that the invention is to be limited only as defined in the appended claims.

We claim:

1. A process for the preparation of a Δ$^{4,9,11}$-gonatriene-3-one of the formula

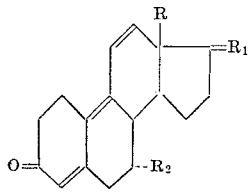

wherein R is a lower alkyl radical of 1 to 4 carbon atoms, R$_1$ is selected from the group consisting of oxygen and

R$_2$ is selected from the group consisting of hydrogen and methyl, R' is selected from the group consisting of hydrogen and an acyl radical of an organic carboxylic acid of 1 to 18 carbon atoms and R" is selected from the group consisting of hydrogen, lower alkyl, lower alkenyl, lower alkynyl and halo lower alkynyl which comprises subjecting a Δ$^{4,9}$-gonadiene-11β-ol-3-one of the formula

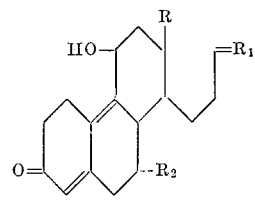

wherein R, R$_1$ and R$_2$ have the above definitions to the action of an aqueous aliphatic carboxylic acid of 1 to 4 carbon atoms containing up to 50% of water at temperatures between 90° and 110° C. to form the corresponding Δ$^{4,9,11}$-gonatriene-3-one and recovering the latter.

2. The process of claim 1, wherein the carboxylic acid is formic acid.

3. The process of claim 1, wherein the carboxylic acid is acetic acid.

4. The process of claim 1, wherein the elevated temperature is about 100° C.

5. The process of claim 1, wherein the Δ$^{4,9}$-gonadiene-11β-ol-3-one is first esterified with an aliphatic carboxylic acid of 1 to 4 carbon atoms to obtain the corresponding 11β-acyloxy compound which is then reacted with an aqueous aliphatic carboxylic acid of 1 to 4 carbon atoms at temperatures between 90° C. and 110° C.

6. The process of claim 5, wherein the esterification is effected at temperatures of 10 to 30° C.

7. The process of claim 5, wherein the esterification is effected with aqueous formic acid.

8. The process of claim 5, wherein the aqueous aliphatic carboxylic acid is aqueous formic acid and the elevated temperature is about 100° C.

9. 11β - acetoxy - 17α - ethynyl - Δ$^{4,9}$ - estradiene - 17β - ol - 3 - one.

10. 11β - formoyloxy - 17α - ethynyl - Δ$^{4,9}$ - estradiene - 17β - ol - 3 - one.

11. 11β - formoyloxy - 17α - methyl - Δ$^{4,9}$ - estradiene - 17β - ol - 3 - one.

References Cited

UNITED STATES PATENTS 3,194,831  7/1965  Reimann et al. _____ 260—488
3,357,975  12/1967  Beard et al. _____ 260—239.55

OTHER REFERENCES

Anner et al., Chimia, vol. 20, December 1966, pp. 434–435.

LEWIS GOTTS, Primary Examiner

ETHEL G. LOVE, Assistant Examiner

U.S. Cl. X.R.

260—397.45

UNITED STATES PATENT OFFICE
CERTIFICATE OF CORRECTION

Patent No. 3,484,462          Dated December 16, 1969

Inventor(s) DANIEL BERTIN et al.

It is certified that error appears in the above-identified patent and that said Letters Patent are hereby corrected as shown below:

Col. 1, line 71,    1965         should be -- 1966 --

Col. 2, drawing 2,  $R_3$        should be -- $R_2$ --

Col. 4, line 44,                 insert --$\lambda$-- before "max".

Col. 5, line 21,    593          should be -- 594 --

Col. 8, line 5,                  structural formula should read

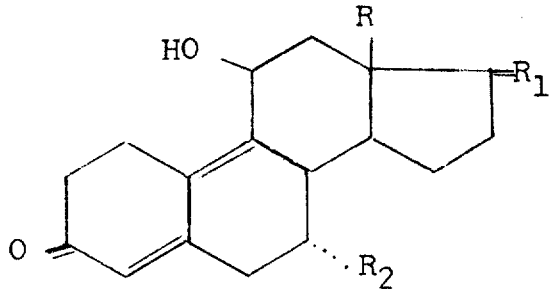

SIGNED AND
SEALED
JUL 21 1970

(SEAL)
Attest:

Edward M. Fletcher, Jr.
Attesting Officer

WILLIAM E. SCHUYLER, JR.
Commissioner of Patents